United States Patent
Pecher et al.

(10) Patent No.: US 7,263,901 B2
(45) Date of Patent: Sep. 4, 2007

(54) METHOD AND DEVICE FOR DETERMINING THE DIRECTION OF DISPLACEMENT OF A ROLLER BEARING COMPONENT

(75) Inventors: Alfred Pecher, Stadtlauringen (DE); Henry Van Der Knokke, Niederwerrn (DE)

(73) Assignee: Fag Kugelfischer AG (DE)

( * ) Notice: Subject to any disclaimer, the term of this patent is extended or adjusted under 35 U.S.C. 154(b) by 114 days.

(21) Appl. No.: 10/543,840

(22) PCT Filed: Jan. 23, 2004

(86) PCT No.: PCT/DE2004/000096

§ 371 (c)(1), (2), (4) Date: Aug. 25, 2005

(87) PCT Pub. No.: WO2004/068146

PCT Pub. Date: Aug. 12, 2004

(65) Prior Publication Data

US 2006/0144164 A1 Jul. 6, 2006

(30) Foreign Application Priority Data

Jan. 31, 2003 (DE) ................................ 103 03 876

(51) Int. Cl.
*G01L 1/22* (2006.01)
*G01L 1/00* (2006.01)
(52) U.S. Cl. .............. 73/862.045; 73/795; 73/862.541; 73/862.68; 384/50
(58) Field of Classification Search ................ 73/862, 73/862.541, 862.045
See application file for complete search history.

(56) References Cited

U.S. PATENT DOCUMENTS 4,112,751 A * 9/1978 Grunbaum ............. 73/862.632
4,168,160 A * 9/1979 Stoferle et al. .......... 73/862.49

(Continued)

FOREIGN PATENT DOCUMENTS

| DE | 26 42 045 A | 3/1978 |
| DE | 2 746 937 | 4/1979 |
| DE | 27 46 937 A | 4/1979 |

(Continued)

OTHER PUBLICATIONS

International Search Report for PCT/DE2004/000096 dated May 6, 2004.

*Primary Examiner*—Edward Lefkowitz
*Assistant Examiner*—Jonathan Dunlap
(74) *Attorney, Agent, or Firm*—Ostrolenk, Faber, Gerb & Soffen, LLP

(57) ABSTRACT

A measuring arrangement in a roller bearing, which determines the direction of displacement of a displaceable bearing component in relation to a stationary bearing component. Four pressure-dependent resistors (R1, R2, R3, R4) of a bridge circuit are arranged successively in a line, in a measuring area on a bearing component and in a parallel manner in relation to the direction of displacement of the rolling body or the displaceable rolling component. The distance (R1-R2) is exactly the same as the distance (R3-R4) and the distance (R2-R3) is greater than the other distances. The positions of the resistors and the bridge circuit are selected in such a manner that a single output signal with an asymmetrical form is created. The rotational direction is, for example, determined by the evaluation of the deviation of a maximum of the mean position between two adjacent minima.

14 Claims, 3 Drawing Sheets

U.S. PATENT DOCUMENTS

| | | | |
|---|---|---|---|
| 4,203,319 A * | 5/1980 | Lechler | 73/862.541 |
| 4,667,521 A * | 5/1987 | Fuss et al. | 73/862.541 |
| 5,140,849 A * | 8/1992 | Fujita et al. | 73/593 |
| 5,952,587 A * | 9/1999 | Rhodes et al. | 73/862.541 |
| 6,190,052 B1 * | 2/2001 | Schnur et al. | 384/519 |
| 2002/0067868 A1 * | 6/2002 | Lyon et al. | 384/43 |
| 2002/0092360 A1 * | 7/2002 | McDearmon | 73/795 |
| 2006/0243068 A1 * | 11/2006 | Ueno et al. | 73/862.322 |
| 2006/0257060 A1 * | 11/2006 | Gempper et al. | 384/448 |

FOREIGN PATENT DOCUMENTS

| | | |
|---|---|---|
| DE | 100 41 093 | 3/2002 |
| DE | 101 00 299 A | 7/2002 |
| EP | 1 229 336 | 8/2002 |

* cited by examiner

METHOD AND DEVICE FOR DETERMINING THE DIRECTION OF DISPLACEMENT OF A ROLLER BEARING COMPONENT

CROSS REFERENCE TO RELATED APPLICATION

The present application is a 35 U.S.C. §§371 national phase conversion of PCT/DE2004/000096, filed 23 Jan. 2004, which claims priority of German Application No.103 03 876.0, filed 31 Jan. 2003. The PCT International Application was published in the German language.

The invention relates to a measuring arrangement, a roller bearing and a method for determining the direction of displacement of a roller bearing component.

BACKGROUND OF THE INVENTION

A measuring roller bearing, in which a force acting on the roller bearing is detected by strain-sensitive sensors arranged on or in its stationary bearing shell, is known from DE 2746937 C2. These strain-sensitive sensors are designed as strain measuring resistors which are interconnected in a Wheatstone type measuring bridge.

Moreover, DE 100 41 093 A1 discloses a roller bearing with strain-sensitive sensors, with which inter alia the rotational speed of a rotatable roller bearing shell can be determined. These sensors are two mutually assigned strain measuring resistors or strain resistor measuring bridge circuits, which are provided on the stationary outer bearing shell. The two strain measuring strips can be arranged in relation to one another such that they are connected in series and are provided in the bearing shell so as to be offset in relation to one another in the direction of rotation by half the angular distance of the rolling elements. For measuring the rotational speed, provision is made such that the signal obtained from these two sensors when their attachment locations are rolled over by rolling elements is supplied to an evaluating circuit, in which the signals undergo difference formation. However, DE 100 41 093 does not indicate how the running direction of the balls of the roller bearing and thus the direction of rotation of a rotating bearing shell can be determined with this measuring bearing.

Lastly, a measuring arrangement in a roller bearing, with which the rotational speed and the running direction of the rolling elements in the bearing can be determined in addition to the force bearing upon the roller bearing, is known from DE 101 00 299 A1. This measuring arrangement is distinguished with regard to recognition of the direction of rotation by a number of pairs of strain-sensitive sensor elements being attached to or on a bearing shell at an angular distance from one another which is approximately ¼ of the angular distance of the rolling elements located in the roller bearing.

Moreover, the pairs of sensors are arranged on the bearing shell in an offset fashion in relation to one another such that they occupy, for examples, a 12 o'clock position and a 9 o'clock position. With an odd number of rolling elements in the bearing, it is ensured according to this specification that the measuring signals from the two sensor elements at the 12 o'clock position and those at the 9 o'clock position have a mutual phase offset. With the aid of this, the running direction of the rolling elements and thus also the direction of rotation of the displaceable bearing ring can be determined.

On the other hand, in an alternative embodiment, if an even number of rolling elements is present in the roller bearing, the running direction of the rolling elements can, according to DE 101 00 299 A1, be determined by the measuring signals from sensor pairs where the mutual angular offset of the sensor pairs deviates slightly from the 90° position between the sensors provided in the 12 o'clock position and in the 9 o'clock position.

For determining the running direction of the rolling elements, this specification discloses that an evaluating device is necessary, which receives signals generated by the two sensor elements of each sensor element pair and, from the amplitude of the signal modulation, determines the relative phase position of each of the rolling elements related to the sensor elements. The running direction of the components guided in the roller bearing can finally be inferred from this relative phase position.

This construction of the measuring arrangement for determining the direction of rotation of for example a component guided in a roller bearing is comparatively complicated. In particular, in the manufacture of such a measuring bearing, the application of the sensor elements of each sensor element pair and also the angularly accurate positioning of the sensor pairs in relation to one another requires a very careful and thus cost-intensive procedure.

OBJECT OF THE INVENTION

Against this background, the object of the invention is to propose a displacement direction measuring device for roller bearings such as pivot bearings and linear bearings which has a particularly cost-effective and less complex construction. In addition, a roller bearing with such a measuring device and an evaluating method for a measuring signal generated by the measuring device are to be proposed.

SUMMARY OF THE INVENTION

The invention starts out from a measuring arrangement on or in a roller bearing for determining the direction of displacement of a displaceable bearing component in relation to a preferably stationary bearing component, in which the measuring arrangement comprises electric resistors (for example strain measuring resistors) which change their electrical resistance depending on pressure and/or tensile force and are interconnected in a bridge circuit.

In such a measuring arrangement, four resistors of the bridge circuit are arranged parallel to the direction of displacement of the rolling elements or of the displaceable bearing component and one behind another in a line in a measuring area on one of the bearing components, that the distance K from the first resistor to the second resistor is exactly the same as the distance L of the third resistor from the fourth resistor, and that the distance J between the two central resistors is greater than the distance K or L between the first resistor and the second resistor and respectively the third resistor and the fourth resistor.

The result of this construction is that, in contrast to the solutions of the prior art, a measuring signal which provides information about the direction of displacement of the displaceable bearing component and thus about the direction of displacement of the component supported by the bearing can be generated with only one sensor in the measuring bearing. It is of particular significance with regard to the practical use of the invention that the electric resistors of the rotation direction sensor can be arranged at any location on the measuring bearing although it is to be ensured that a force F can act on the measuring arrangement via the rolling elements.

Moreover, very precise arrangement of the resistors of the measuring bridge is not necessary, as just a rough asymmetry of the distances of the resistors from one another is sufficient for generating a left-skewed or right-skewed measuring signal which allows a statement to be made about the direction of rotation. Such measuring roller bearings can therefore be manufactured very cost-effectively and can advantageously be used for mounting rotating or linearly displaced displacement elements such as for instance pumps, pneumatic devices, piston/cylinder arrangements or sealing systems.

In a particularly advantageous embodiment of the invention, provision is made, for generating a particularly unambiguous measuring signal of the measuring bridge, that the distance H between the first resistor and the third resistor and also the distance G between the second resistor and the fourth resistor are exactly the same as the distance between two rolling elements arranged one immediately behind the other.

To increase the number of measured values which can be determined for example per revolution of the displaced bearing component, and thus to improve the statistical meaningfulness of the measured values, more than only one of the measuring bridges according to the invention can also be provided on the measuring bearing and connected to an evaluating device. The measuring bridges are preferably arranged on the undisplaced bearing component.

The invention also relates to a roller bearing, in or on the bearing component of which the resistors of the measuring device according to the invention are provided in any area. In a preferred embodiment of the invention, this measuring area lies in a circumferential groove of a stationary bearing outer ring or in a longitudinal groove of a stationary linear bearing component, in which the resistors of the measuring bridge and also the connecting lines belonging to the measuring bridge are sputtered on. In another variant, however, these electric resistors can also be applied in the form of foil strain gauges to a flexible substrate carrier and can together with the latter be glued in the said groove. As far as the shape of the foil strain gauges is concerned, use can be made of commercially available rectangular foil strain gauges or foil strain gauges of any basic shape.

In addition, the invention also relates to a method for determining the direction of displacement of the displaceable bearing component with a measuring signal of the measuring arrangement according to the invention. In this evaluating method, the measuring signal M of the measuring bridge with the said resistors is analyzed with regard to the left-running or right-running of the displaceable bearing component as to whether the positive amplitude maximum $A_{max1}$ concerned occurs at a time which does not lie temporally in the center $t_{sym}$ between the occurrence of two consecutive negative amplitude maxima $A_{min1}$, $A_{min2}$.

Moreover, it can be established whether the negative amplitude maximum $A_{min1}$ concerned of the measuring signal M occurs at a time which is not located temporally in the center $t_{sym}$ between the occurrence of two consecutive positive amplitude maxima $A_{max1}$, $A_{max2}$.

To this end, provision is made according to the method that the direction of displacement of the displaceable bearing component is determined by means of an evaluating program which uses the equation $$sym = +\text{sign}\left[\frac{t_{min2} - t_{min1}}{2} - (t_{max1} - t_{min1})\right] \quad \text{(equ. 1)}$$

in which a positive sign of the equation result indicates the direction of rotation in one direction and a negative sign of the equation result indicates the opposite direction of displacement.

Furthermore, the direction of displacement of the displaceable bearing component can be determined by means of the evaluating program using the equation $$sym = -\text{sign}\left[\frac{t_{max2} - t_{max1}}{2} - (t_{min1} - t_{max1})\right] \quad \text{(equ. 2)}$$

in which a positive sign of the equation result indicates the direction of displacement in one direction and a negative sign of the equation result indicates the opposite direction of displacement.

Lastly, provision can be made according to the method that the calculation results of the equation equ. 1 and the equation equ. 2 are compared with one another and, if the signs correspond, the signs are regarded as a true displacement direction indicator, so as then to make the latter available for further information utilization. In the event of the signs determined by the two calculations (equ. 1, equ. 2) differing from one another, the measuring and calculation results are rejected at least in part and new measurements and calculations for determining the direction of displacement are carried out.

BRIEF DESCRIPTION OF THE DRAWINGS

The measuring arrangement according to the invention, a roller bearing with the measuring arrangement and a method for evaluating the measuring signal generated by the measuring arrangement and also advantageous developments thereof can be explained with reference to concrete illustrative embodiments, which are shown in the accompanying drawing, in which.

DETAILED DESCRIPTION OF THE DRAWINGS

Figure 1:
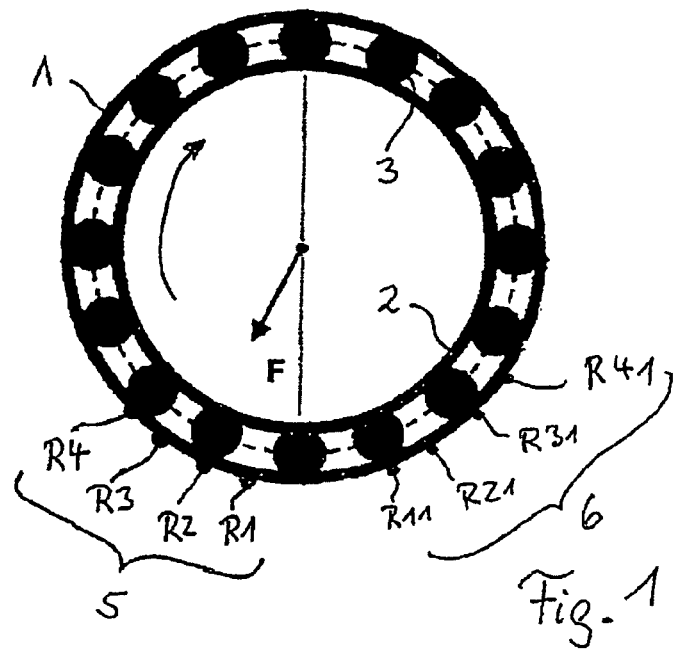
FIG. 1 shows a diagrammatic cross section through a roller bearing according to the invention.

Accordingly, FIG. 1 shows a diagrammatic cross-sectional illustration of a roller bearing, in which a stationary outer ring 1 supports an inner ring 2 rotatably by means of rolling elements 3. This inner ring 2 serves to support a component (not illustrated here), which exerts a force F on the inner ring 2. As can be seen from this illustration, this force F acts on the outer ring 1 via the inner ring 2 and the rolling elements 3.

On the circumferential surface of the outer ring 1, measuring resistors R1, R2, R3, R4, which change their electrical resistance depending on strain and with which the deformation of the outer ring 1 when each measuring resistor R1, R2, R3, R4 is rolled over by the rolling elements 3 can therefore be established, are attached in a measuring area 5.

Moreover, FIG. 1 also shows that a second measuring bridge with resistors R11, R21, R31, R41, which is provided and suitable for generating a comparable measuring signal to the first measuring bridge in the measuring area 5, can also be arranged in a measuring area 6 on the rotatable bearing outer ring 1. However, this second measuring bridge will be necessary only if further measured values are desired for instance for increasing the number of measured values or for verifying the measured values of the first measuring bridge. In this connection, however, it is important that the two measuring bridges with the resistors R1, R2, R3, R4 and respectively R11, R21, R31, R41 are not aligned particularly with regard to their distance from one another. At most, it should be ensured that the two measuring areas 5, 6 are exposed to the force F for deforming the said resistors via the rolling elements 3.

Figure 2:
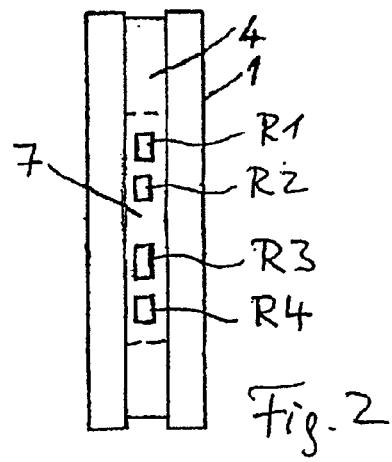
FIG. 2 shows a top view of the circumference of the bearing according to FIG. 1 in the area of the measuring bridge.

As FIG. 2 shows, the measuring resistors R1, R2, R3, R4 are preferably positioned in a circumferential groove 4 of the outer ring 1 and also arranged in a gluing-on and sputtering area 7 in such a way that in each case two resistors R1, R2 and R3, R4, in each case forming a pair, are positioned axially parallel to the direction of displacement of the inner ring 1 or of the rolling elements 3.

Figure 3:
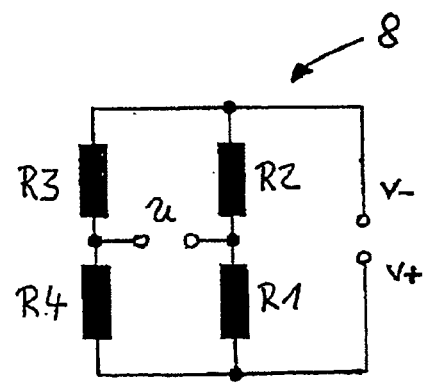
FIG. 3 shows a simplified illustration of the electric measuring bridge circuit according to FIG. 2.

The resistors R1, R2, R3, R4 are interconnected to form a measuring bridge 8, which is illustrated in a simple connection diagram in FIG. 3. This measuring bridge 8 has a voltage U applied in a manner known per se and supplies a measuring signal M via the contact points V− and V+.

Figure 4:
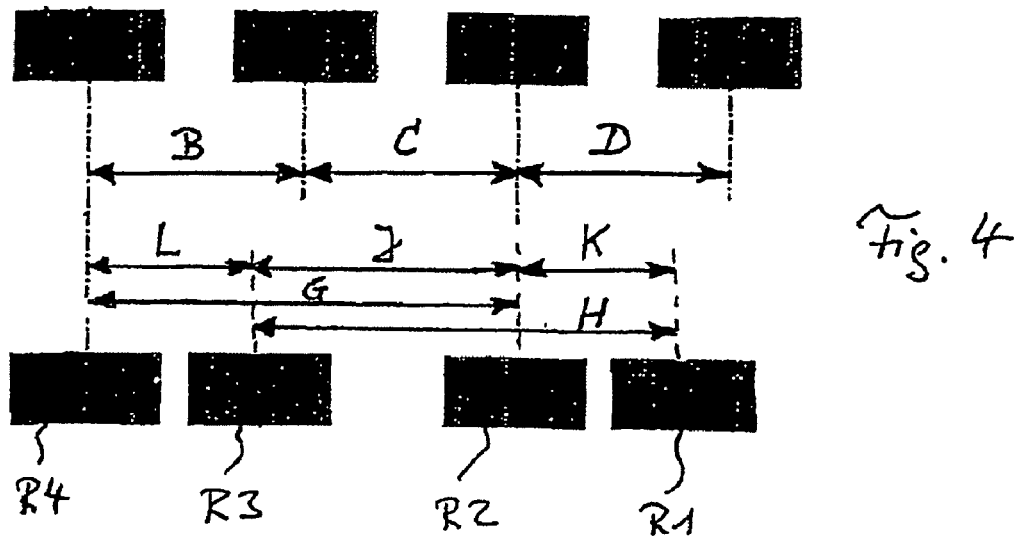
FIG. 4 shows a comparison of a resistor arrangement of a measuring bridge according to the prior art with a resistor arrangement according to the invention.

As FIG. 4 shows in the upper half of the illustration, the electric resistors are in known measuring bridges arranged in such a way that they have the same distance B, C, D from one another and there is no pairing.

In the lower part of FIG. 4, on the other hand, the arrangement according to the invention of the electric resistors R1, R2, R3, R4 of the measuring bridge 8 is illustrated, with which the direction of rotation of the inner ring 2 can be established in this example. As FIG. 4 shows, the resistors R1, R2, R3, R4 are to this end arranged parallel to the direction of displacement of the rolling elements 3 or of the displaceable bearing inner ring 2 and one behind another in a line in such a way that the resistors R1 and R3 and also the resistors R2 and R4, in each case forming a pair, are displaced in relation to one another in comparison with the arrangement according to the prior art. In this connection, the distance K from the first resistor R1 to the second resistor R2 is exactly the same as the distance L of the third resistor R3 from the fourth resistor R4. Furthermore, the distance J between the two central resistors R2 and R3 is greater than the distances K and L between the first resistor R1 and the second resistor R2 and respectively the third resistor R3 and the fourth resistor R4.

Moreover, provision is made in this preferred embodiment of the invention that the distance H between the first resistor R1 and the third resistor R3 and also the distance G between the second resistor R2 and the fourth resistor R4 are exactly the same as the distance between two immediately adjacent rolling elements 3.

Figure 5:
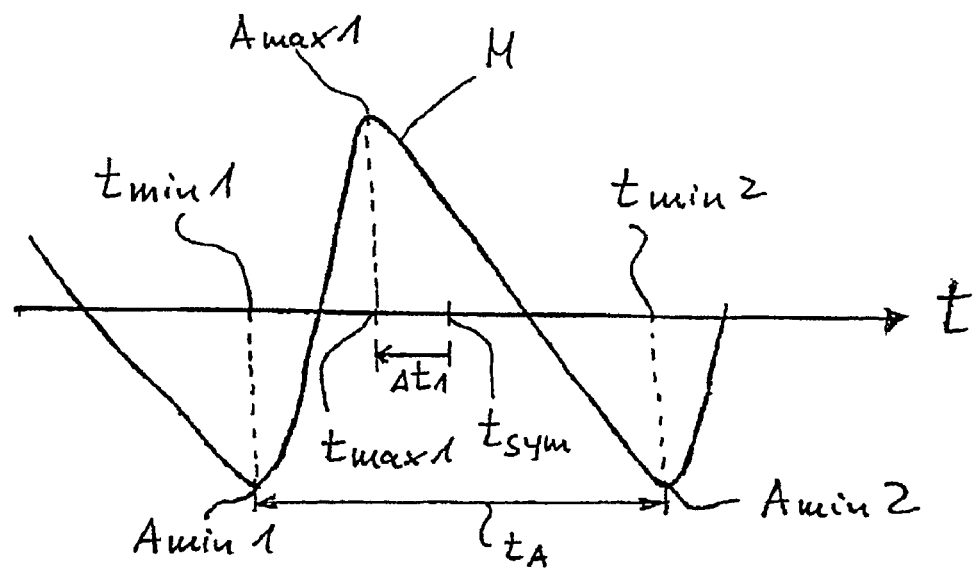
FIG. 5 shows an illustration of a measuring signal generated by the measuring bridge according to the invention with measuring points for calculating the direction of displacement of a bearing component.
Figure 6:
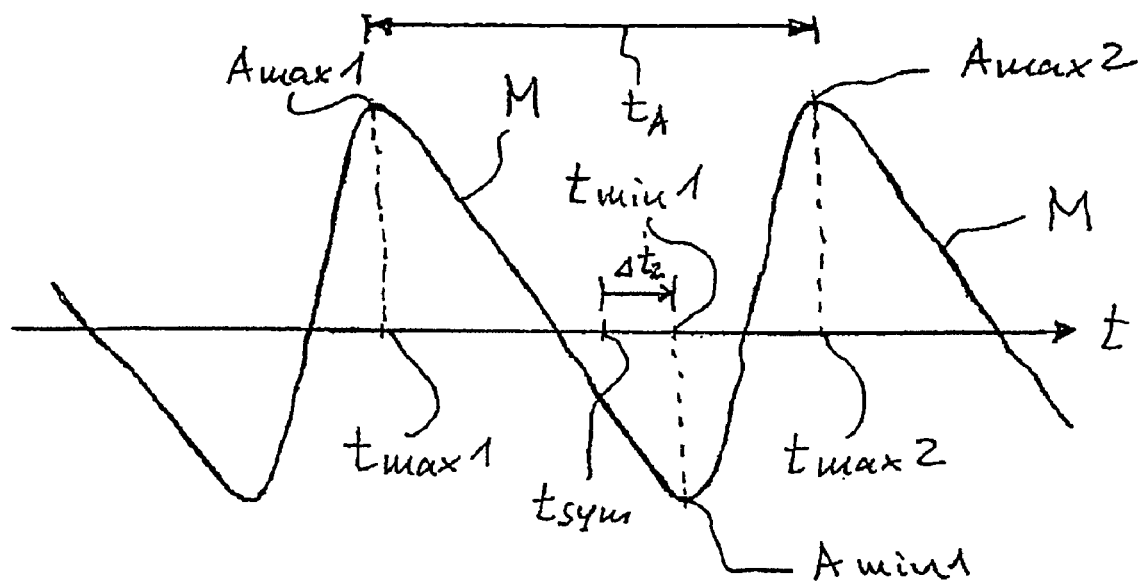
FIG. 6 shows an illustration like in FIG. 5 with different measuring points.

When the resistors R1, R2, R3, R4 are rolled over, such a measuring bridge generates a measuring signal M, which is illustrated by way of example in FIGS. 5 and 6. As these diagrams show, the voltage shapes measured do not have a symmetrical but an asymmetrical curve shape. This asymmetry is due to the fact that the distance K or L between two resistors R1, R2 or R3, R4 in the measuring bridge 8 is smaller than the distance J between two immediately adjacent resistors R2, R3. The superposition of the two resistance changes of the resistors R1, R2 then leads to an asymmetrical deformation of the measuring signal M of the measuring bridge 8.

It is true that the degree of asymmetry is exaggerated in FIG. 5 and FIG. 6 but this shows very clearly that for example in FIG. 5 the positive maximum amplitude $A_{max1}$ of the measuring signal M occurs at a time $t_{max1}$ which distinctly precedes, by a time period $t_1$, the time $t_{sym}$ at which the amplitude maximum would actually take place in the case of a symmetrical measuring signal shape. This time $t_{sym}$ results from halving the time period $t_A$ which lies between the occurrence of two negative amplitude maxima $A_{min1}$ and $A_{min2}$ at the times $t_{min1}$ and $t_{min2}$.

With the aid of the equation $$sym = +\text{sign}\left[\frac{t\min2 - t\min1}{2} - (t\max1 - t\min1)\right] \quad \text{(equ. 1)}$$

the symmetry of the measuring curve M can be calculated from the measured values $t_{min1}$ and $t_{min2}$ of the times for the occurrence of two consecutive negative amplitude maxima $A_{min1}$ and $A_{min2}$ and also with $t_{max1}$ for the time of the positive amplitude maximum $A_{max1}$.

As far as the result of this calculation is concerned, it is its sign, to which a defined direction of displacement is assigned, which is important with regard to determining the direction of displacement. Whether a left-rotating measuring bearing generates a positive or negative calculation value thus depends on the installation position of a measuring bearing according to the invention. However, once a given direction of displacement has been assigned a sign, and if the bearing is installed as per definition, the displacement direction calculation results in a reliable value with regard to the actual direction of rotation of the bearing.

As it would preferably be desirable not to receive a value for the direction of rotation for each individual half period of the measuring signal M, the following symmetry calculation of the measuring curve M is carried out several times:

$$sym = -\text{sign}\left[\frac{t\max2 - t\max1}{2} - (t\min1 - t\max1)\right] \quad \text{(equ. 2)}$$

in which the measured values $t_{max1}$ and $t_{max2}$ stand for the times for the occurrence of two consecutive positive amplitude maxima and $t_{min1}$ stands for the time of the negative amplitude maximum $A_{min1}$.

FIG. 6 shows the measuring curve M in a time segment in which the measurements for the calculation with the second equation equ. 2 are carried out. It is clear that the two positive maximum amplitudes $A_{max1}$ and $A_{max2}$ occur at times $t_{max1}$ and respectively $t_{max2}$, while the negative amplitude maximum $A_{min1}$ occurs a time period $t_2$ later than would be expected in the case of a symmetrical signal shape. This is because this symmetry time $t_{sym}$ is located in the center of the time period $t_A$ which lies between the occurrence of the two positive amplitude maxima $A_{max1}$ and $A_{max2}$ at times $t_{max1}$ and respectively $t_{max2}$.

This second calculation provides a second result value for the symmetry of the measuring signal, so that the safety of the displacement direction determination can be increased by a subsequent sign comparison of the calculation results of the equations equ. 1 and equ. 2. In this connection, the sign value or displacement direction value determined is passed on for further information processing (for example display device, control computer) only when both calculation results have led to the same sign value. If the calculations result in different signs, the values determined are averaged (preferably averaged over an odd number of individual results) and a new measuring and calculation procedure for displacement direction determination is carried out.

The invention claimed is:

1. A measuring arrangement at a roller bearing, the bearing comprising a relatively stationary bearing component, a displacement bearing component displaceable with respect to the stationary component and rolling elements between the bearing components for allowing the displacement between them; the measuring arrangement being operable for determining a direction of displacement of the displaceable bearing component;

the measuring arrangement comprising four electric resistors operable to change their respective electrical resistances depending on at least one of pressure and tensile force applied to the resistor and a bridge circuit connecting the resistors;

the four resistors in the bridge circuit being arranged parallel to a direction of displacement of the rolling elements or of the displaceable bearing component, the resistors arranged one behind another in a line in a measuring area on one of the bearing components and are arranged such that a first distance from the first of the resistors to the second of the resistors is the same as a second distance from the third of the resistors to the fourth of the resistors, and such that a third distance between the two of the resistors at the center of the arrangement of four resistors is greater than the first distance between the first resistor and the second resistor and is greater than the second distance between the third resistor and the fourth resistor.

2. The measuring arrangement as claimed in claim 1, wherein the resistors are arranged such that a fifth distance between the first resistor and the third resistor is also the fifth distance between the second resistor and the fourth resistor and is the same as the distance between two immediately adjacent ones of the rolling elements.

3. The measuring arrangement as claimed in claim 1, wherein the resistors are arranged on the stationary bearing component.

4. The measuring arrangement as claimed in claim 1, wherein the bearing includes adjacent measuring areas;
more than one of the measuring bridges is arranged at the bearing at adjacent measuring areas, a common evaluating device to which the bridges are connected.

5. The measuring arrangement as claimed in claim 1, wherein the resistors are foil strain gauges.

6. A roller bearing with a measuring arrangement as claimed in claim 1, wherein the resistors of a measuring bridge are glued on or sputtered on in a gluing-on or sputtering area at one of the bearing components.

7. The roller bearing as claimed in claim 6, wherein the bearing is a pivot bearing and the stationary bearing component is a bearing outer ring of the bearing pivot bearing.

8. The roller bearing as claimed in claim 6, wherein the roller bearing is a linear bearing.

9. A method for determining the direction of displacement of a displaceable bearing component using a measuring signal produced by providing a roller bearing comprising a relatively stationary bearing component, a displaceable bearing component displaceable with respect to the stationary component and rolling elements between the bearing components for allowing the displacement between them;

providing a measuring arrangement at the roller bearing, the measuring arrangement being operable for determining a direction of displacement of the displaceable bearing component;

providing the measuring arrangement to comprise four electric resistors operable to change their respective electrical resistances depending on at least one of pressure and tensile force applied to the resistor and a bridge circuit connecting the resistors;

providing the four resistors in the bridge circuit arranged parallel to a direction of displacement of the rolling elements or of the displaceable bearing component, the resistors arranged one behind another in a line in a measuring area on one of the bearing components and arranged such that a first distance from the first of the resistors to the second of the resistors is the same as a second distance from the third of the resistors to the fourth of the resistors, and such that a third distance between the two of the resistors at the center of the arrangement of four resistors is greater than the first distance between the first resistor and the second resistor and is greater than the second distance between the third resistor and the fourth resistor; and generating a measuring signal from the bridge circuit;

the method for determining further comprising analyzing the measuring signal with regard to the left-running or right-running of the displaceable bearing component to determine whether a positive amplitude maximum ($A_{max1}$) occurs at a time which does not lie temporally in the center ($t_{sym}$) between occurrence of two consecutive negative amplitude maxima ($A_{min1}$, $A_{min2}$), or whether the negative amplitude maximum ($A_{min1}$) concerned of the measuring signal occurs at a time which is not located temporally in the center ($t_{sym}$) between the occurrence of two consecutive positive amplitude maxima ($A_{max1}$, $A_{max2}$).

10. The method as claimed in claim 9, further comprising determining the direction of displacement of the displaceable bearing component using an evaluating program which uses the equation $$sym = +\text{sign}\left[\frac{tmin2 - tmin1}{2} - (tmax1 - tmin1)\right] \quad \text{(equ. 1)}$$

in which a positive sign of the equation result indicates the direction of displacement in one direction and a negative sign of the equation result indicates the opposite direction.

11. The method as claimed in claim 9, further comprising determining the direction of displacement of the displaceable bearing component using an evaluating program using the equation $$sym = -\text{sign}\left[\frac{t\max2 - t\max1}{2} - (t\min1 - t\max1)\right] \quad \text{(equ. 2)}$$

in which a positive sign of the equation result indicates the direction of displacement in one direction and a negative sign of the equation result indicates the opposite direction.

12. The method as claimed in claim 10, further comprising determining the direction of displacement of the displaceable bearing component using an evaluating program using the equation $$sym = -\text{sign}\left[\frac{t\max2 - t\max1}{2} - (t\min1 - t\max1)\right] \quad \text{(equ. 2)}$$

in which a positive sign of the equation result indicates the direction of displacement in one direction and a negative sign of the equation result indicates the opposite direction;
comparing the calculation results of the equation equ. 1 and the equation equ. 2 with one another to determine if the signs correspond, and if they correspond, they are rated as true displacement direction indicators and are available for further information utilization, whereas, if the signs determined by the two calculations differ from one another, averaging the measuring and calculation results.

13. The method as claimed in claim 12, wherein the results are averaged over an odd number of individual results.

14. The roller bearing as claimed in claim 6, wherein the gluing-on or sputtering area are arranged in a groove of the stationary bearing component.

\* \* \* \* \*